United States Patent [19]
Duan et al.

[11] Patent Number: 5,900,457
[45] Date of Patent: May 4, 1999

[54] AQUEOUS POLYURETHANE DISPERSIONS FORMED FROM POLYISOCYANATES HAVING A METHYLENE BRIDGE

[75] Inventors: Youlu Duan, Maplewood; Douglas U. Gwost, Shoreview; Yi Wei, St. Paul; Yuduo Zhu, Woodbury; Sonja E. Stammler, Marine; Michael J. Maksymkiw, White Bear Lake, all of Minn.

[73] Assignee: H.B. Fuller Licensing & Financing, Inc., St. Paul, Minn.

[21] Appl. No.: 08/961,752

[22] Filed: Oct. 31, 1997

Related U.S. Application Data

[63] Continuation-in-part of application No. 08/613,804, Mar. 5, 1996.

[51] Int. Cl.$^6$ .............................. C08J 3/00; C08K 3/20; C08L 75/00; B05D 3/02
[52] U.S. Cl. ................ 524/591; 524/839; 524/840; 427/372.2; 427/385.5
[58] Field of Search ....................... 524/591, 839, 524/840; 427/372.2, 385.5

[56] References Cited

U.S. PATENT DOCUMENTS

| | | | |
|---|---|---|---|
| 3,624,020 | 11/1971 | Klebert et al. | 260/29.6 |
| 3,684,758 | 8/1972 | Honig et al. | 260/29.6 NR |
| 3,862,074 | 1/1975 | Hickey | 260/29.6 NR |
| 4,046,729 | 9/1977 | Scriven et al. | 260/29.6 TN |
| 4,147,679 | 4/1979 | Scriven et al. | 260/29.6 TN |
| 4,644,030 | 2/1987 | Loewrigkeit et al. | 524/457 |
| 4,742,095 | 5/1988 | Markusch et al. | 523/322 |
| 4,851,459 | 7/1989 | Ramalingam | 523/414 |
| 4,870,129 | 9/1989 | Henning et al. | 524/597 |
| 4,888,383 | 12/1989 | Huybrechts | 524/832 |
| 4,927,876 | 5/1990 | Coogan et al. | 524/457 |
| 5,095,069 | 3/1992 | Ambrose et al. | 524/591 |
| 5,137,961 | 8/1992 | Goos et al. | 524/457 |
| 5,354,807 | 10/1994 | Dochniak | 524/591 |
| 5,371,133 | 12/1994 | Stanley | 524/457 |
| 5,608,000 | 3/1997 | Duan et al. | 524/591 |
| 5,610,232 | 3/1997 | Duan et al. | 524/840 |
| 5,637,639 | 6/1997 | Duan et al. | 524/591 |

OTHER PUBLICATIONS

Product Data from *Mitsui Toatsu Chemicals, Inc.*, Jun., 1995.

*Organic Chemistry, Second Edition*, T.W. Graham Solomons, p. 112.

*Primary Examiner*—Patrick D. Niland
*Attorney, Agent, or Firm*—Nancy N. Quan

[57] ABSTRACT

The present invention is directed to aqueous polyurethane dispersions and aqueous polyurethane-acrylic dispersions, especially polymer dispersions formed from norbornane diisocyanate. The dispersions, and the dried polymers therefrom, are useful adhesives that provide enhanced bond strength when subjected to increased thermal and mechanical stress. Additionally, the inventive dispersions form polymers having increased adhesion compared to similar polymers based on cycloaliphatic diisocyanates which are free of a methylene bridge.

21 Claims, No Drawings

AQUEOUS POLYURETHANE DISPERSIONS FORMED FROM POLYISOCYANATES HAVING A METHYLENE BRIDGE

CROSS-REFERENCE TO RELATED APPLICATION

This application is a Continuation-In-Part of copending application Ser. No. 08/613,804, filed Mar. 5, 1996, incorporated herein by reference.

FIELD OF THE INVENTION

This invention relates to aqueous polymer dispersions formed from cycloaliphatic diisocyanates for use in adhesives and coatings, specifically it relates to aqueous polyurethane dispersions formed from norbornane diisocyanate.

BACKGROUND OF THE INVENTION

It is well known that cycloaliphatic polyisocyanates can be used for the preparation of aqueous polymer dispersions. Generally, the dispersions are prepared by a two-stage process wherein an isocyanate-terminated polyurethane prepolymer is formed in the first stage by reacting an excess of polyisocyanate with an isocyanate reactive compound. The prepolymer is then dispersed in water and the remaining isocyanate is further reacted to form an aqueous polyurethane dispersion. Cycloaliphatic polyisocyanates have been shown to provide polyurethane-urea polymers having increased water resistance and light stability compared to similar polymers based on aromatic polyisocyanates. The cycloaliphatic polyisocyanates most often used for the preparation of aqueous polyurethane-urea dispersions include isophorone diisocyanate (IPDI®), hydrogenated diphenyl-methane diisocyanate ($H_{12}$MDI) and hydrogenated meta-xylene diisocyanate ($H_6$m-XDI) which are further described in U.S. Pat. No. 4,147,679 (Scriven et al.), U.S. Pat. 4,870,129 (Henning et al.), U.S. Pat. No. 4,742,095 (Markusch et al.), and U.S. Pat. No. 5,608,000 (Duan et al.).

Recent literature disclosed norbornane diisocyanate (NBDI) as a new class of isocyanate. For example, Product Data information from *Mitsui Toatsu Chemicals, Inc.,* June, 1995 generally describes the characteristics of NBDI and polymers formed therefrom. Examples given describe NBDI as a raw material for the production of non-yellowing polyurethane, polyurea, or polyisocyanurate resins in the field of paints and coatings. The literature also states, "as NBDI has a stiff Norbornane structure, it would be expected that the polymers based on NBDI show higher thermal stability and hardness than ones based on isocyanates with a linear chain structure such as HDI.". The reference did not teach or suggest the use of NBDI as a raw material for the preparation of aqueous polymer adhesives and the polymer properties therefrom.

Therefore, there remains a need for aqueous polymer adhesives which provide enhanced bond strength when subjected to increased thermal and mechanical stress.

SUMMARY OF THE INVENTION

The present invention is directed to aqueous polyurethane adhesives formed from diisocyanate having a methylene bridge. The adhesives are shown to provide enhanced bond strength when subjected to increased thermal and mechanical stress.

The aqueous polyurethane dispersions of the present invention comprise the reaction product of:
a) at least one organic polyhydroxy compound;
b) at least one polyisocyanate comprising diisocyanates having a methylene bridge; and
c) at least one compound selected from the group consisting of amine compounds, hydrazinic compounds, water and mixtures thereof.

Surprisingly, the adhesives formed are characterized as having increased peel adhesion and heat resistance, as compared to similar polymer dispersions formed from cycloaliphatic diisocyanates which do not contain a methylene bridge, e.g., IPDI®, while maintaining the other characteristics such as particle size and viscosity.

In another aspect, the invention discloses a method for the preparation of aqueous polyurethane-norbornane adhesives comprising the steps of:
a) forming a water dispersible isocyanate-terminated polyurethane prepolymer comprising the reaction product of:
  i) at least one organic polyhydroxy compound; and
  ii) at least one polyisocyanate comprising diisocyanates having a methylene bridge;
b) dispersing said prepolymer in water to form a prepolymer dispersion; and
c) reacting the prepolymer dispersion with at least one compound selected from the group consisting of amine compounds, hydrazinic compounds, water and mixtures thereof.

The invention further comprises aqueous polyurethane-acrylic dispersions, and a method of making such dispersions, wherein the polyurethane segment is formed from polyisocyanates having a methylene bridge. The polyurethane dispersion is synthesized in the presence of ethylenically unsaturated monomers and forms polymer blends and/or hybrids having enhanced interpenetrating polymer networks. Such a network can improve the physical properties of the dried films such as adhesives and coatings. The preferred method comprises the steps of:
a) providing an aqueous polyurethane dispersion comprising the reaction product of:
  i) at least one organic polyhydroxy compound;
  ii) at least one polyisocyanate comprising a methylene bridge; and
  iii) optionally, at least one compound selected from the group consisting of amine compounds, hydrazinic compounds and mixtures thereof.
b) providing at least one free-radical initiator;
c) providing at least one pre-emulsion comprising one or more ethylenically unsaturated monomers, water and at least one surfactant; and
d) polymerizing said pre-emulsion in the presence of said dispersion.

The polymerization described above is initiated by the free-radical initiator and the polyurethane dispersion may serve as a seed. Alternatively, the polyurethane dispersion can be present in the pre-emulsion.

The inventive compositions are useful as adhesives, binders and primers on substrates including ceramic, wood, metal, concrete, glass and plastic and can be used in applications including woodworking, automotive, film laminating, membrane pressing and in the manufacture of shoes.

DETAILED DESCRIPTION OF THE INVENTION

The term "polyurethane" as described herein is defined as a polymer containing two or more urethane groups and is also intended to cover high molecular weight compounds which contain urea groups in addition to urethane groups.

The term "dispersion" as described herein is defined as a polymer suspended in an aqueous medium and is also intended to cover solutions.

The term "ethylenically unsaturated monomer" is defined as any compound containing acrylic groups, vinyl groups, allylic groups or acrylamide groups.

The term "acrylic polymer" is defined as a polymer containing two or more free-radically polymerized ethylenically-unsaturated monomers.

The aqueous polyurethane dispersions disclosed in the present invention have enhanced adhesion characteristics, when dried and subjected to increased thermal and mechanical stress, compared to similar polymers formed from cycloaliphatic diisocyanates which do not contain a methylene bridge. It is surmised that the methylene bridge present in the cycloaliphatic diisocyanate molecule allows the bicyclic system to be locked into a specific conformation. It is further surmised that such a conformation limits the flexibility of the polymer matrix to provide a more rigid structure resulting in increased thermal stability and adhesion through mechanical interlocking. The isomerism of cycloalkanes is further described in "Organic Chemistry", T. W. Graham Solomons, second edition, page 112, incorporated herein by reference.

The polyisocyanate used to form the aqueous polyurethane are 2,5-Bis(isocyanatomethyl)bicyclo[2.2.1]heptane and/or 2,6-Bis(isocyanatomethyl)bicyclo[2.2.1]heptane (norbornane diisocyanate). Norbornane diisocyanate is a cycloaliphatic diisocyanate available from Mitsui Toatsu Chemicals, Incorporated (Kasumigaseki. Chiyoda-KU Tokyo, Japan). Additionally, NBDI can be used alone or in combination with other polyisocyanates including cycloaliphatic polyisocyanates, linear aliphatic polyisocyanates, aromatic polyisocyanates and their mixtures. Examples of suitable polyisocyanates to be used in combination with norbornane diisocyanate include hexamethylene diisocyanate, isophorone diisocyanate, 4,4'- and/or 2,4'-diisocyanato diphenylmethane and those described in U.S. Pat. No. 4,742,095 (Markusch et al.), incorporated herein by reference. The preferred polyisocyanate mixture is norbornane diisocyanate and hexamethylene diisocyanate. The use of more than one polyisocyanate is often preferred in that such mixtures can enhance the prepolymer processing and/or physical characteristics. Examples of patents which disclose polyisocyanate mixtures include U.S. Pat. No. 5,637,639 (Duan et al.) and U.S. Pat. No. 4,927,876 (Coogan et al.) incorporated herein by reference. If a mixture of polyisocyanates is used, the material mixture can contain a polyisocyanate ratio of norbornane diisocyanate to other polyisocyanate in a range of from about 95:5 to about 5:95 and most preferably from about 75:25 to about 25:75, based on the total weight of the polyisocyanate mixture.

At least one organic polyhydroxyl compound is used to form the aqueous polyurethane-norbornane dispersions of the present invention. Suitable examples of polyhydroxyl compounds include polyester polyols, polyether polyols, polyester-ether polyols, polycarbonate polyols, polyurethane-based polyols, polyacetal polyols, polyacrylic polyols, polycaprolactone polyols, polythioether polyols and the anionic polyols described in U.S. Pat. No. 5,610,232 (Duan et al.) incorporated herein by reference. Additional compounds containing active hydrogens which are useful include those described in U.S. Pat. No. 4,046,729 (Scriven et al.) incorporated herein by reference.

If desired, dihydroxyl alkanoic acids may be used in the preparation of the dispersions described in the present invention. Suitable examples include 2,2-dimethylolethanoic acid, 2,2-dimethylolpropanoic acid, 2,2-dimethylolbutanoic acid and 2,2-dimethylolpentanoic acid. Additional examples of dihydroxy alkanoic acids are further described in U.S. Pat. No. 5,608,000 (Duan et al.) incorporated herein by reference. The dihydroxy alkanoic acid can be present in a range of from about 0.1% by weight to about 5% by weight, and preferably from about 2% by weight to about 4% by weight based on total solids.

If present in the inventive dispersions, the dihydroxy alkanoic acid can be converted to other ionic groups, e.g., salts, before or after the isocyanate-terminated polyurethane prepolymer has been dispersed in water. These other ionic groups can be formed with a base including alkali metal salts such as sodium hydroxide, tertiary amine such as triethylamine and ammonia hydroxide.

The isocyanate-terminated polyurethane prepolymer is prepared by reacting a stoichiometric excess of diisocyanate with compounds containing active hydrogen atoms. The reactants are in such proportions that the resulting percent isocyanate can be in a range of from about 1% by weight to about 10% by weight, and preferably from about 2% by weight to about 5% by weight based on the total weight of the prepolymer. The prepolymers can be formed at a temperature in a range of from about 25° C. to about 120° C., and preferably from about 65° C. to about 100° C. At temperatures of less than 25° C. the prepolymer's viscosity is increased, making it more difficult to process. For example, increased prepolymer viscositys can quickly wear down mechanical parts within the equipment, such as gears and pumps. Additionally, viscous prepolymers often require increased mechanical agitation over extended periods of time to adequately provide uniform dispersions. It is possible to use co-solvents to help reduce prepolymer viscosity but such additives are less desirable in that environmental laws and health and safety issues often limit their use. Alternatively, a temperature greater than 120° C. can be undesirable to the prepolymers' physical characteristics in that elevated temperatures can cause isocyanate side reactions and/or pyrolysis.

Once the isocyanate-terminated polyurethane prepolymer has been formed, it is preferably dispersed in distilled/deionized water using agitation. The quantity of water used in the preparation of the aqueous polyurethane dispersions or solutions is from about 70% by weight to about 50% by weight, preferably from about 65% by weight to about 60% by weight based on total weight of the dispersion or solution. The prepolymer can be dispersed by adding the prepolymer incrementally to the aqueous dispersing medium or by adding the aqueous dispersing medium incrementally to the prepolymer. The water temperature before dispersing can be in a range of from about 1° C. to about 99° C., and preferably from about 25° C. to about 85° C. A water temperature less than 1° C. can be detrimental to the dispersion process in that water no longer can be considered an aqueous vehicle for dispersing prepolymers. It may be possible to depress the freezing point of water below 0° C. by the addition of organic and/or inorganic salts but such materials can destabilize the dispersion and often provide dried polymers having reduced water resistant characteristics. Alternatively, a water temperature greater than 99° C. can be detrimental to the dispersion process since the accelerated evaporation of water at these temperatures can increase the complexity of the dispersing process and thus, such conditions are better avoided.

If desired, external emulsifying agents which are free of active hydrogen atoms can be used to enhance the isocyanate-terminated polyurethane prepolymer water dispersibility or film forming characteristics. For example, external dispersing agents such as cationic surfactants, anionic surfactants and nonionic surfactants can be used to enhance the prepolymers' dispersibility in water. The surfactant may be added to the prepolymer prior to dispersing in water or, alternatively, the surfactant may be added to the water before or after the prepolymer has been dispersed. Additionally, surfactants can be used to enhance the final dispersions' film forming characteristics. For example, to enhance the dispersions' wet-out characteristics on low energy substrates, it may be necessary to lower the dispersions' aqueous surface tension with surface active agents such as the surfactants described above. The surfactants may be present in the dispersion up to about 5% by weight and preferably from about 1% by weight to about 0.001% by weight, based on the total weight of the final dispersion. A surfactant level less than 1% by weight is often preferred in that higher surfactant levels sometimes can adversely affect the dried polymers' water resistance characteristics.

The dispersed isocyanate-terminated polyurethane prepolymer can then be reacted with compounds containing active hydrogen atoms including the amine and hydrazinic compounds described in U.S. Pat. No. 5,354,807 (Dochniak), and the water and peroxides described in U.S. Pat. No. 4,851,459 (Ramalingam), all of which are incorporated herein by reference. If amines and/or hydrazinic compounds are used, the isocyanate to active hydrogen atom ratio is in a range of from about 1:0.7 to about 1:1.3, preferably from about 1:0.9 to about 1:1. Preferably, water is used as the chain extending agent when such adhesive compositions are desired. For example, when an isocyanate reacts with water, an amine is formed and carbon dioxide is the by-product. The amine can then react with another isocyanate to form a urea linkage, thus one mole of water consumes two mole of isocyanate. Urea groups can be detrimental to the adhesive in that such groups often increase the polymers' heat activation temperature, making them more difficult to heat activate.

If desired, the prepolymer may be prepared in the presence of co-solvents provided that the solvent is free of active hydrogen atoms. The addition of co-solvent may be desirable to lower prepolymer viscosities and aid in dispersing, especially those co-solvents such as acetone and n-methylpyrolidinone which are water soluble. Examples of additional co-solvents that may be employed are ketones, esters, ethers and ketoesters. The co-solvent may be present in the prepolymer in a range of from 0% by weight to about 30% by weight, preferably from about 1% by weight to about 5% by weight.

The aqueous polyurethane dispersions of the present invention can have a monomodal or bimodal particle size distribution. Furthermore, the average particle size distribution can be in a range of from about 30 nanometers to about 500 nanometers, and preferably from about 40 nanometers to about 250 nanometers. An average particle size distribution greater than about 500 nanometers is undesirable to the dispersions' stability and/or film forming characteristics. For example, anionic polyurethane dispersions having an average particle size distribution greater than about 500 nanometers often settle over time. Increased sedimentation can be detrimental in laminating adhesive applications in that such materials may produce irregular coat weights, and thus bonded articles can have decreased optical clarity.

The inventive dispersions can have a solids content in a range of from about 20% by weight to about 45% by weight, and preferably from about 30% by weight to about 40%. A solids content outside the preferred range may be undesirable for certain applications. For example, an aqueous polymer dispersion having a lower solids content often requires extended dry times. Alternatively, a higher solid content often forms dispersions having increased viscosities making them more difficult to process.

The aqueous polyurethane dispersions described in the present invention are preferably anionic and can have a pH in a range of from about 6 to about 10, and preferably from about 7 to about 9. The anionic groups present in the prepolymer are made ionic using counter cations such as alkali metal hydroxides, tertiary amines and ammonia. Preferred counter cations are formed from sodium hydroxide, potassium hydroxide and triethylamine. In the preparation of aqueous polymer adhesives having reduced volatile organic chemicals (VOC) and/or leachable contaminants, the use of alkali metal salt are most preferred, because volatile counter cations such as triethylamine often increases the dispersions' VOC, while alkali metal salts are considered non-volatile and the strong ionic attraction reduces the possibility of leachable contaminates.

The inventive dispersions can have viscosities in a range of from about 50 mPa.s to about 10,000 mPa.s, and preferably from about 100 mPa.s to about 1,000 mPa.s. In many adhesive applications, lower viscosities are often preferred in that it allows the end user to selectively increase the viscosity, if desired, with effective amounts of thickening agents. Alternatively, aqueous polymer adhesives having a higher viscosity (i.e. greater than about 10,000 mPa.s) can be undesirable in some applications where low viscosity's are required for enhanced processing. However, if lower viscosity's are required, an end user often reduces the viscosity using additional solvent, though this may be undesirable in that higher levels of solvent can extend the dry times and often slows down the production process. Special drying equipment such as heaters may be used to accelerate the evaporation of the excess solvent but this accommodation often increases the complexity and cost of the operation.

To further enhance the properties of the dispersions described in the present invention such as adhesion, solvent resistance and heat resistance it may be desirable to formulate the aqueous polyurethane dispersions with dissimilar polymer dispersions. Suitable examples include water-based polyacrylics, water-based polyvinyl-acrylics, water-based polystyrene-acrylics, water-based polyvinyl acetate, water-based polyvinyl-acetate-ethylene terpolymers and their mixtures. The formulations can have a weight ratio of aqueous polyurethane-norbornane dispersion to other dissimilar polymer in a range of from about 9:1 to about 1:9, and preferably from about 7.5:2.5 to about 2.5:7.5 based on total weight.

The present invention further comprises aqueous polyurethane-acrylic dispersions wherein the polyurethanes disclosed are synthesized in the presence of ethylenically unsaturated monomers to generate polymer blends and/or polymer hybrids. The term hybrid is defined as covalently linked dissimilar polymers (e.g. polyurethane polymers and acrylic polymers). Such processes are further described in U.S. Pat. No. 4,644,030 (Loewrigkeit et al.), U.S. Pat. No. 3,624,020 (Klebert et al.), U.S. Pat. No. 3,684,758 (Honig et al.), U.S. Pat. No. 3,862,074 (Hickey), U.S. Pat. No. 4,888,383 (Huybrechts), U.S. Pat. No. 5,095,069 (Ambrose et al.), U.S. Pat. No. 5,137,961 (Goos et al.) and U.S. Pat. No. 5,371,133 (Stanley), all of which are incorporated herein by reference. Preferably, such dispersions are formed using a seed emulsion polymerization comprising the steps of:

a) providing an aqueous polyurethane dispersion comprising the reaction product of:
  i) at least one organic polyhydroxy compound;
  ii) at least one polyisocyanate comprising a methylene bridge; and
  iii) optionally, at least one compound selected from the group consisting of amine compounds, hydrazinic compounds and mixtures thereof.
b) providing at least one free radical initiator;
c) providing at least one pre-emulsion comprising one or more ethylenically unsaturated monomers, water and at least one surfactant; and
d) polymerizing said monomer in the presence of said dispersion.

If desired, water dispersible polyfunctional crosslinking agents can be formulated with the polymer dispersions described in the present invention. Such additives have been known to enhance polymer properties including adhesion, solvent resistance and heat resistance. Suitable crosslinking agents can be selected from polyisocyanates, polyoxazolines, polycarbodiimides, polyaziridines, polyepoxies and their mixtures. The crosslinking agents can be present in the formulations in a range of from about 1% by weight to about 20% by weight, and preferably from about 3% by weight to about 7% by weight based on the total weight of the formulation. The crosslinking agents increase the adhesive crosslink density for enhanced heat resistant characteristic.

As two-component adhesives, the inventive dispersions may be formulated with at least one water dispersible polyfunctional crosslinking agent selected from the group consisting of polyisocyanates, polyaziridines, melamine-formaldehyde resins, polyepoxies, polyaziridines, polyepoxies, polycarbodiimides and their mixtures. The crosslinking agents can be present in the formulations in a range of from about 1% by weight to about 20% by weight, and preferably from about 3% by weight to about 7% by weight based on the total weight of the formulation.

The dispersions may be used as an adhesive, binder, coating or primer and can be applied to any substrate including paper, wood, leather, metal, ceramics, cloth, natural rubber and synthetic polymers such as plastic. Additionally, the dispersions may be applied onto a substrate using application methods known in the art including brushing, spraying and roll coating.

The characteristics of the dispersions may be further modified by the addition of compounds including surfactants, defoaming agents, coalesing aids, fungicides, bactericides, plasticizers, thickening agents, fillers, reactive pigments, UV stabilizers, perfume-like materials, sequestering agents, organic co-solvents including acetone and n-methylpyrrolidinone, water dispersible waxes, oils, fire retardant agents and their mixtures. Such materials may be introduced at any stage of the production or end-use process.

Test Methods

The following test methods were used to characterize the polymers of the present invention:

Peel Strength

This test method was used to determine the adhesives peel strength values at ambient room temperatures. A precut sheet (26.67 cm.×32.38 cm.) of 10 mil thick clear, pressed, polished polyvinyl chloride (PVC) was cleaned with isopropyl alcohol and placed on a glass plate. The aqueous adhesive was applied onto the film using a applicator set at 5 mils according to ASTM D323-87. The coated PVC was dried at ambient room temperatures and a second sheet of uncoated PVC was placed thereon. The sheet was cut into a 2.54 cm.×15.24 cm. strip making sure that a 13.81 cm. section at each end of the test specimen was free of adhesive. The specimen was then heat sealed, with the uncoated PVC in contact with the heated upper platen, using a platen temperature of about 71° C. for 30-seconds at 3.5 kgs./cu.cm. The bonded specimen was then aged at ambient room temperatures for 1 to 2-hours. Peel strength values were evaluated on a Thwing Albert Intellect® 500 using a crosshead speed of 30.48 cm. per minute.

Peel Adhesion Failure Temperature

This test method was used to determine the adhesives bond strength when subjected to increased thermal and mechanical stress. The test specimens were prepared in the following manner. Approximately 1.5 grams of the water-based adhesive was coated onto a 2.5 cm. by 2.5 cm. area located on the end of a 2.5 cm. by 10.5 cm. strip of polyvinyl chloride (PVC). The coated specimen was then dried at ambient room temperature and matted with a second piece of PVC, using a T-peel configuration, and pressed together using a Sentinal® Heat Sealer Model 808/1 (Sencorp Systems, Inc., MA) at 71° C. for 30-seconds using a 3.5 kgs./cu.cm. nip pressure. The test specimens were then attached to a static 0.1 kg. load and placed in a Tenny® oven and subjected to a 25° C. increase in temperature each hour until bond failure or to a maximum temperature of 125° C. Failure temperatures were automatically recorded by a sensing unit which records the temperature at which the bond fails.

EXAMPLES

The present invention is further illustrated by the following non-limiting examples.

Example 1

Example 1-A describes the preparation of an aqueous polyurethane dispersion which is part of the present invention:

213.8 grams of Rucoflex® XS-5483-55 which is a sulfonated polyester polyol from Ruco® Corp (Hicksville, N.Y.), 10.5 grams of dimethylolpropionic acid and 11.3 grams of 1,4-butanediol were combined and heated to approximately 65° C. 86.6 grams of norbornane diisocyanate and 19.1 grams of acetone were added and the material mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 552.6 grams of deionized water. To the prepolymer dispersion was charged a solution containing 50 grams of deionized water and 5 grams of ethylene diamine. The aqueous polyurethane dispersion had a peel strength of 7.8 kgs. per 2.54 cm. and a PAFT greater than 125° C.

Example 1-B describes the preparation of an aqueous polyurethane dispersion which is not part of the present invention:

213.8 grams of Rucoflex® XS-5483-55, 10.5 grams of dimethylolpropionic acid and 11.3 grams of 1,4-butanediol were combined and heated to approximately 65° C. 86.6 grams of isophorone diisocyanate and 19.1 grams of acetone were added and the material mixture was agitated and heated to 70° C. for 2.5 hours. 8.0 grams of triethylamine was added and allowed to react for 10 minutes to form a water dispersible NCO-terminated polyurethane prepolymer. The prepolymer was then dispersed in 552.6 grams of deionized water. To the prepolymer dispersion was charged a solution containing 50 grams of deionized water and 5 grams of ethylene diamine. The aqueous polyurethane dispersion had a peel strength of 6.2 kgs. per 2.54 cm. and a PAFT greater than 125° C.

The data indicates that Example 1-A has increased peel strength compared to Example 1-B, thus showing the utility of the invention.

Example 2

Example 2-A describes the preparation of an aqueous polyurethane dispersion which is part of the present invention:

289.0 grams of Rucoflex® XS-5483-55, 12.2 grams of dimethylolpropionic acid and 3.4 grams of 1,4-butanediol were combined and heated to approximately 65° C. 24.06 grams of norbornane diisocyanate, 39.2 grams of hexamethylene diisocyanate and 19.31 grams of acetone were added and the material mixture was agitated and heated to 70° C. for 2.5 hours. 9.2 grams of triethylamine was added and allowed to react for 10 minutes to form a water dispersible NCO-terminated polyurethane-norbornane prepolymer. The prepolymer was then dispersed in 608.1 grams of deionized water and stirred for 2 hours at 65° C. The aqueous polyurethane-norbornane dispersion had a peel strength of 6.3 kgs. per 2.54 cm. and a PAFT greater than 84° C.

Example 2-B describes the preparation of an aqueous polyurethane dispersion which is not part of the present invention:

289 grams of Rucoflex® XS-5483-55, 12.2 grams of dimethylolpropionic acid and 3.4 grams of 1,4-butanediol were combined and heated to approximately 65° C. 25.9 grams of isophorone diisocyanate, 39.2 grams hexamethylene diisocyanate and 21.7 grams of acetone were added and the material mixture was agitated and heated to 70° C. for 2.5 hours. 9.2 grams of triethylamine was added and allowed to react for 10 minutes to form a water dispersible NCO-terminated polyurethane prepolymer. The prepolymer was then dispersed in 682.4 grams of deionized water and stirred for 2 hours at 60° C. The aqueous polyurethane dispersion had a peel strength of 6.3 kgs. per 2.54 cm. and a PAFT greater than 63° C.

The data indicates that Example 2-A has increased PAFT compared to Example 2-B, thus showing the utility of the invention.

Example 3

Example 3-A describes the preparation of an aqueous polyurethane dispersion which is part of the present invention:

119.1 grams of Rucoflex® XS-5483-55, 106.9 grams Rucoflex® XS-5570-55 which is a sulfonated polyether-ester polyol from Ruco® Corp. (Hicksville, N.Y.), 10.05 grams of dimethylolpropionic acid and 6.75 grams of 1,4-butanediol were combined and heated to approximately 65° C. 72.2 grams of norbornane diisocyanate and 18.5 grams of acetone were added and the material mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 581.4 grams of deionized water and stirred another 2 hours at 65° C. The aqueous polyurethane-norbornane dispersion had a peel strength of 6.3 kgs. per 2.54 cm. and a PAFT greater than 88° C.

Example 3-B describes the preparation of an aqueous polyurethane dispersion which is not part of the present invention:

119.1 grams of Rucoflex® XS-5483-55, 106.9 grams Rucoflex®, XS-5570-55, 10.05 grams of dimethylolpropionic acid and 6.75 grams of 1,4-butanediol were combined and heated to approximately 65° C. 25.9 grams of isophorone diisocyanate, 39.2 grams hexamethylene diisocyanate and 18.05 grams of acetone were added and the mixture was agitated and heated to 70° C. for 2.5 hours. 8.0 grams of triethylamine was added and allowed to react for 10 minutes to form a water dispersible NCO-terminated polyurethane prepolymer. The prepolymer was then dispersed in 568.6 grams of deionized water and stirred at 60° C. for 2 hours. The aqueous polyurethane dispersion had a peel strength of 6.1 kgs. per 2.54 cm. and a PAFT greater than 60° C.

The data indicates that Example 3-A has increased PAFT compared to Example 3-B, thus showing the utility of the invention.

Example 4

Example 4-A describes the aqueous polyurethane dispersion which is used to form the hybrid:

213.8 grams of Rucoflex® XS-5483-55, 10.5 grams of dimethylolpropionic acid and 6.75 grams of 1,4-butanediol were combined and heated to approximately 65° C. 72.2 grams of norbornane diisocyanate and 17.8 grams of acetone were added and the material mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 559.4 grams of deionized water and heated an additional 2-hours at 60° C. The aqueous polyurethane-norbornane dispersion had a peel strength of 9.2 kgs. per 2.54 cm. and a PAFT greater than 125° C.

Example 4-B describes the preparation of an aqueous polyurethane-norbornane-acrylic dispersion hybrid using the aqueous polyurethane dispersion of Example 4-A: 72.7 grams of deionized water, 1.0 grams ammonia hydroxide and 7.3 grams Pluronic L64 which is a surfactant from BASF were charged into a vessel and mixed for 10 minutes. A mixture of materials consisting of 128 grams of methyl methacrylate, 130.9 grams of n-butyl acrylate and 5 grams of hydroxyl ethylacrylate were then charged into the reactor over a 25 minute period, using agitation, to form a pre-emulsion. In a separate vessel, equipped with an agitator, a thermometer, a condenser and a nitrogen inlet, was charged 140 grams of deionized water, 0.065 grams of 2-mercaptoethanol, 0.1 grams of hydrosulfite, 0.04 grams of Hamp-Ol 4.5% Iron from Hampshire and 265 grams of the aqueous polyurethane-norbornane described in Example 4-A. The pre-emulsion was fed into the reactor over a 4-hour period keeping the temperature at 65° C. Simultaneously, a mixture containing 1.6 grams of t-butyl hydrogen peroxide, 15.6 grams of deionized water and a mixture containing 0.73 grams of hydrosulfite and 15.6 grams of deionized water were added to the reactor over a 4.5-hour period. After the feeds were complete, the reactor contents were heated an additional hour at 65° C. The dispersion was cooled to ambient room temperature and filtered through 200 mesh filter. The dispersion had a solid content of 47%, a pH of 8.32 and a viscosity of 316 mPas. The dried polymer had a peel strength of 9.7 kgs. per 2.54 cm. and a PAFT greater than 125° C.

Example 5

Example 5 describes the preparation of a carboxylated polyurethane dispersion:

A reaction vessel was charged with 207.2 grams of Rucoflex® S-105-55 which is a polyester polyol from Ruco® Corp (Hickville, N.Y.), 11.25 grams of 1,4-butanediol, 10 grams of dimethylolpropionic acid, 86.62 grams of norbornane diisocyanate and 19.13 grams of acetone. The mixture was heated for approximately 2.5 hours at 70° C. The resulting NCO-terminated polyurethane-norbornane prepolymer was charged with 9.0 grams of triethylamine and stirred an additional 15 minutes. The prepolymer was then dispersed in 553 grams of deionized water and to the dispersion was charged a solution containing 5.04 grams of ethylenediamine and 50 grams of water. The dispersion had a pH of 8.21, a viscosity of 20 mPa.s, a solids content of 33.0% and a mean particle size distribution of 298 nm.

Example 6

Example 6 describes the preparation of a carboxylated polyurethane dispersion:

A reaction vessel was charged with 207.2 grams of Rucoflex® S-105-55 which is a polyester polyol from Ruco Corp., 11.25 grams of 1,4-butanediol, 10 grams of dimethylolpropionic acid, 28.87 grams of norbornane diisocyanate, 47 grams of hexamethylene diisocyanate and 19.13 grams of acetone. The mixture was heated for approximately 2.5 hours at 70° C. The resulting NCO-terminated polyurethane-norbornane prepolymer was charged with 9.0 grams of triethylamine and stirred an additional 15 minutes. The prepolymer was then dispersed in 552.6 grams of deionized water and to the dispersion was charged a solution containing 5.04 grams of ethylenediamine and 50 grams of water. The dispersion had a pH of 8.17, a viscosity of 120 mPa.s, a solids content of 32.18% and a mean particle size distribution of 314 nm.

Example 7

Example 7 evaluates the adhesion characteristics of the polymer described in Example 6 using a simulated membrane pressing application.

The dispersion described in Example 6 was charged with 5 wt. % Bayhydur® XP-7063 which is a water dispersible polyfunctional isocyanate from Bayer Corp (Pittsburgh, Pa.). The materials were mixed for approximately 5-minutes using mild agitation. The adhesive composition was then applied to a medium density fiberboard using a #40 Meyer rod and dried at ambient conditions. A 16 mil sheet of polyvinyl chloride (Hoescht Celanese, Dallas, Tex.) was mated with the adhesive coated substrate and heat activated using a Sentinal® Heat Sealer Model 808/1 from Sencorp Systems, Inc. (MA) using a temperature of 82° C., a pressure of 6.327 kgs./sq.cm. and a dwell time of 30-seconds. The bonded substrates were aged for 72-hours at room temperature and evaluated for 180° peel values at ambient room temperature and 82° C. The peel values were run at 30.48 cm. per minute. At room temperature, the bonded substrate had a peel value of 7.4 kgs. by 1.9 linear cm. and at 82° C. a peel value of 3.5 kgs. by 1.9 linear cm.

What is claimed is:

1. An aqueous polyurethane adhesive dispersion comprising the reaction product of:
   a) at least one organic polyhydroxy compound;
   b) at least one polyisocyanate comprising a methylene bridge;
   c) water; and
   d) optionally, at least one compound selected from the group consisting of amine compounds, hydrazinic compounds and mixtures thereof.

2. The dispersion as described in claim 1, wherein said compound is selected from the group consisting of polyester polyols, polyether polyols, polyester-ether polyols, polycarbonate polyols, polyurethane-based polyols, polyacetal polyols, polyacrylic polyols, polycaprolactone polyols, polythioether polyols, and mixtures thereof.

3. The dispersion as described in claim 1, further comprising dihydroxy alkanoic acid.

4. The dispersion as described in claim 3, wherein the dihydroxy alkanoic acid is selected from the group consisting of 2,2-dimethylolethanoic acid, 2,2-dimethylolpropanoic acid, 2,2-dimethylolbutanoic acid, 2,2-dimethylolpentanoic acid and mixtures thereof.

5. The dispersion as described in claim 1, wherein said polyisocyanate is norbornane diisocyanate.

6. The dispersion as described in claim 5, wherein the norbornane diisocyanate is selected from the group consisting of 2,5-Bis(isocyanatomethyl)bicyclo[2.2.1]heptane, 2,6-Bis(isocyanatomethyl)bicyclo[2.2.1]heptane and mixtures thereof.

7. The dispersion as described in claim 1, further comprising a polyisocyanate selected from the group consisting of cycloaliphatic polyisocyanates, linear aliphatic polyisocyanates, aromatic polyisocyanates and mixtures thereof.

8. The dispersion as described in claim 7, wherein the polyisocyanate is selected from the group consisting of hexamethylene diisocyanate, isophorone diisocyanate, 4,4'-diisocyanate diphenylmethane, 2,4'-diisocyanate diphenylmethane, norbornane diisocyanate and mixtures thereof.

9. The dispersion as described in claim 1, further comprising at least one water dispersible polyfunctional crosslinking agent.

10. The dispersion as described in claim 9, wherein said crosslinking agent is selected from the group consisting of polyisocyanates, polyaziridines, melamine-formaldehyde resins, polyepoxies, polyoxazolines, polycarbodiimides and mixtures thereof.

11. The dispersion as described in claim 1, wherein said dispersion is an anionic polyurethane dispersion.

12. The dispersion as described in claim 1, wherein said dispersion contains anionic groups selected from the group consisting of carboxylic acid, sulfonic acid and mixtures thereof.

13. The dispersion as described in claim 1, wherein said dispersion has a viscosity in a range of from about 100 mPa.s to about 1,000 mPa.s.

14. The dispersion as described in claim 1, wherein said dispersion has an average particle size distribution in a range of from about 30 nanometers to about 500 nanometers.

15. A method for the preparation of an aqueous polyurethane dispersion comprising the steps of:
   a) forming a water dispersible isocyanate-terminated polyurethane prepolymer comprising the reaction product of at least one organic polyhydroxy compound and at least one polyisocyanate comprising norbornane diisocyanate;
   b) dispersing said prepolymer in water to form a prepolymer dispersion; and
   c) reacting the prepolymer dispersion with at least one compound selected from the group consisting of amine compounds, hydrazinic compounds, water and mixtures thereof.

16. The method as described in claim 15, wherein step a) is conducted at a temperature in a range of from about 25° C. to about 120° C.

17. A method for the preparation of a coated substrate using the dispersion described in claim 1, the method comprising the steps of:
   a) applying said dispersion onto at least one surface of a substrate to form a wet-coated substrate; and
   b) drying the wet-coated substrate.

18. The dispersion as described in claim 1, wherein said dispersion forms an adhesive when dried.

19. The dispersion as described in claim 18, wherein said adhesive has a peel strength value greater than about 7 kilograms per 2.54 centimeter.

20. A method for the preparation of an aqueous polyurethane-acrylic dispersion comprising the steps of:
   a) providing an aqueous polyurethane dispersion comprising the reaction product of;
      i) at least one organic polyhydroxy compound;
      ii) at least one polyisocyanate comprising a methylene bridge; and
      iii) optionally, at least one compound selected from the group consisting of amine compounds, hydrazinic compounds and mixtures thereof.
   b) providing at least one free-radical initiator;
   c) providing at least one pre-emulsion comprising one or more ethylenically unsaturated monomers, water and at least one surfactant; and
   d) polymerizing said pre-emulsion in the presence of said dispersion.

21. The method of claim 20, wherein said polyurethane dispersion serves as a seed for the polymerization of said pre-emulsion.

* * * * *